(12) United States Patent
Miller

(10) Patent No.: US 8,845,028 B2
(45) Date of Patent: Sep. 30, 2014

(54) INFANT SUPPORTING DEVICE

(71) Applicant: Ryan N. Miller, Lancaster, PA (US)

(72) Inventor: Ryan N. Miller, Lancaster, PA (US)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 3 days.

(21) Appl. No.: 13/761,176

(22) Filed: Feb. 7, 2013

(65) Prior Publication Data

US 2013/0214567 A1 Aug. 22, 2013

Related U.S. Application Data

(60) Provisional application No. 61/633,719, filed on Feb. 16, 2012.

(51) Int. Cl.
*A47D 13/02* (2006.01)
*A47D 13/10* (2006.01)
*A47D 1/00* (2006.01)

(52) U.S. Cl.
CPC .............. *A47D 1/002* (2013.01); *A47D 13/105* (2013.01)
USPC .. 297/354.12; 297/118; 297/274; 297/354.13

(58) Field of Classification Search
USPC ................ 297/274, 118, 130, 354.12, 354.13
See application file for complete search history.

(56) References Cited

U.S. PATENT DOCUMENTS

| 6,257,659 | B1 * | 7/2001 | Wilkins et al. ....... 297/354.13 X |
| 6,361,106 | B1 | 3/2002 | Huang |
| 6,390,555 | B2 * | 5/2002 | Wilkins et al. .......... 297/354.13 |
| 6,951,371 | B2 * | 10/2005 | Wang ......................... 297/130 X |
| 7,044,497 | B2 * | 5/2006 | Hartenstine et al. ....... 297/130 X |
| 7,219,959 | B2 * | 5/2007 | Ransil et al. .......... 297/354.12 X |
| 7,845,728 | B2 * | 12/2010 | Chen et al. ..................... 297/274 |
| 8,047,609 | B2 * | 11/2011 | Chen et al. ..................... 297/274 |
| 8,205,943 | B2 * | 6/2012 | Zhong ........................... 297/274 |
| 8,636,601 | B2 * | 1/2014 | Zhang et al. .................... 472/119 |
| 2001/0015569 | A1 * | 8/2001 | Wilkins et al. .......... 297/354.13 |
| 2007/0007804 | A1 * | 1/2007 | Pemberton et al. ......... 297/260.2 |
| 2007/0273191 | A1 | 11/2007 | Chen |
| 2009/0181780 | A1 * | 7/2009 | Myers et al. ............. 297/118 X |
| 2010/0237667 | A1 * | 9/2010 | Guy et al. ............. 297/354.13 X |
| 2012/0205954 | A1 * | 8/2012 | Pollack et al. ....... 297/354.12 X |
| 2012/0235450 | A1 * | 9/2012 | Oren et al. ........... 297/354.13 X |
| 2013/0119736 | A1 * | 5/2013 | Miller et al. ............. 297/354.12 |

FOREIGN PATENT DOCUMENTS

| DE | 195 30 717 A1 | 2/1997 |
| JP | 3081291 U | 8/2001 |
| JP | 2003189984 A | 7/2003 |
| JP | 200835916 A | 2/2008 |
| JP | 3172189 U | 12/2011 |

* cited by examiner

*Primary Examiner* — Rodney B White
(74) *Attorney, Agent, or Firm* — Winston Hsu; Scott Margo

(57) ABSTRACT

An infant supporting device incorporates a central member on either side of a seat frame that houses a reclining mechanism along with mounting locations for the seat frame, a bounce wire, a carry handle, and a seat support wire. With one movement of a recline driving mechanism, a sliding member in the seat frame pushes a second gear to disengage from a first gear of the central member, and a main body of the seat frame is then rotatable with respect to the central members within a range of recline angles. The design provides an economical, smaller, and lighter weight solution to house the main features of the infant supporting device.

9 Claims, 11 Drawing Sheets

INFANT SUPPORTING DEVICE

CROSS REFERENCE TO RELATED APPLICATIONS

This application claims the benefits of U.S. Provisional Application No. 61/633,719, which was filed on Feb. 16, 2012, and is incorporated herein by reference.

BACKGROUND OF THE INVENTION

1. Field of the Invention

The invention relates to an infant device, and more particularly, to an infant supporting device with reclining adjustability.

2. Description of the Prior Art

Bouncer seats provide caregivers with a convenient spot in which to place their infant child for sleeping, eating, or simply for containment. Most bouncers on the market today consist of a wire frame with a fabric (soft goods) seat suspended from it and are rated for use from birth up to 25 lbs or when the child can sit up unassisted (approximately 6 months). Typically, the wire frame is a simple one- or two-piece design that both supports the soft goods and provides the integral spring for the bouncing function. For added safety, bouncers usually come equipped with a harness of some soft, and for added convenience, some bouncers come with extra accouterments such as toy bars, mobiles, vibration, and the like.

Because of the convenience offered by bouncer seats, caregivers tend to use these products as soon as they bring their infant home and in many different locations around their homes. Most bouncer seats do not provide caregivers a means of easily and safely carrying their child while installed in the product. Because of this, if the caregiver wants to move the product to an alternate location, the child should be removed from the product before the product can be moved to a new location and then the child is re-installed in the product. Otherwise, the caregiver could move the product with the child in it by carrying it with two hands at two indiscriminate points on the bouncer, which may be unsafe due to potential fall hazards.

Further, most bouncer seats do not provide a means for the caregiver to select the angle at which their child is seated in the product. This could be potentially hazardous because, depending on the seatback angle of the product, a small infant might not have the neck strength to fully support his head and could have his head overly tilted to one side. This may lead to apnea of the airway and/or positional asphyxiation, if the child is left unattended.

SUMMARY OF THE INVENTION

To avoid such potential problem, the invention provides an infant supporting device that can be easily adjusted with multiple reclined positions for the comfort and safety of an infant seated therein.

According to one embodiment, an infant supporting device is provided. The infant supporting device includes a base frame, a pair of central members mounted on the base frame, a seat frame rotatably mounted on the pair of central members, and a recline driving mechanism. One of the central members includes a first gear. The seat frame includes a main body, a sliding member slidably mounted on the main body, and a second gear in mesh with the first gear of the central member and adapted to be moved by the sliding member to disengage from the first gear. The recline driving mechanism is coupled to the sliding member and is adapted to move the sliding member along the main body. When the second gear is moved by the sliding member to disengage from the first gear, the main body is adjustable to one of a plurality of reclined positions with respect to the base frame.

According to the embodiment, the sliding member includes a first incline surface and the second gear includes a channel having a second incline surface. The first incline surface is moveable in the channel and the second incline surface is adapted to be abutted by the first incline surface to disengage from the first gear.

According to the embodiment, the sliding member is adapted to be moved by the recline driving mechanism in a first direction along the main body and the second gear is adapted to be moved by the sliding member in a second direction.

According to the embodiment, the infant supporting device further includes a restoring member connected between the second gear and the central member and adapted for providing a restoring force to the second gear when the second gear is moved by the sliding member.

According to the embodiment, each of the central members includes an opening for allowing the main body of the seat frame to pass. Each of the openings has an upper end and a lower end for withstanding the main body.

According to the embodiment, the main body includes an upper frame and a lower frame assembled with each other, and the sliding member is slidably mounted on the upper frame.

According to the embodiment, the base frame includes a bounce wire for providing bouncing movement for the seat frame, a seat support wire for supporting the seat frame, and a support leg for stabilizing the infant supporting device on a surface.

According to the embodiment, the infant supporting device further includes a carry handle rotatably mounted on the central members.

According to the embodiment, the recline driving mechanism includes a recline handle and a recline wire that is connected to the recline handle. The recline handle is mounted on the main body, and the recline wire is coupled to the sliding member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
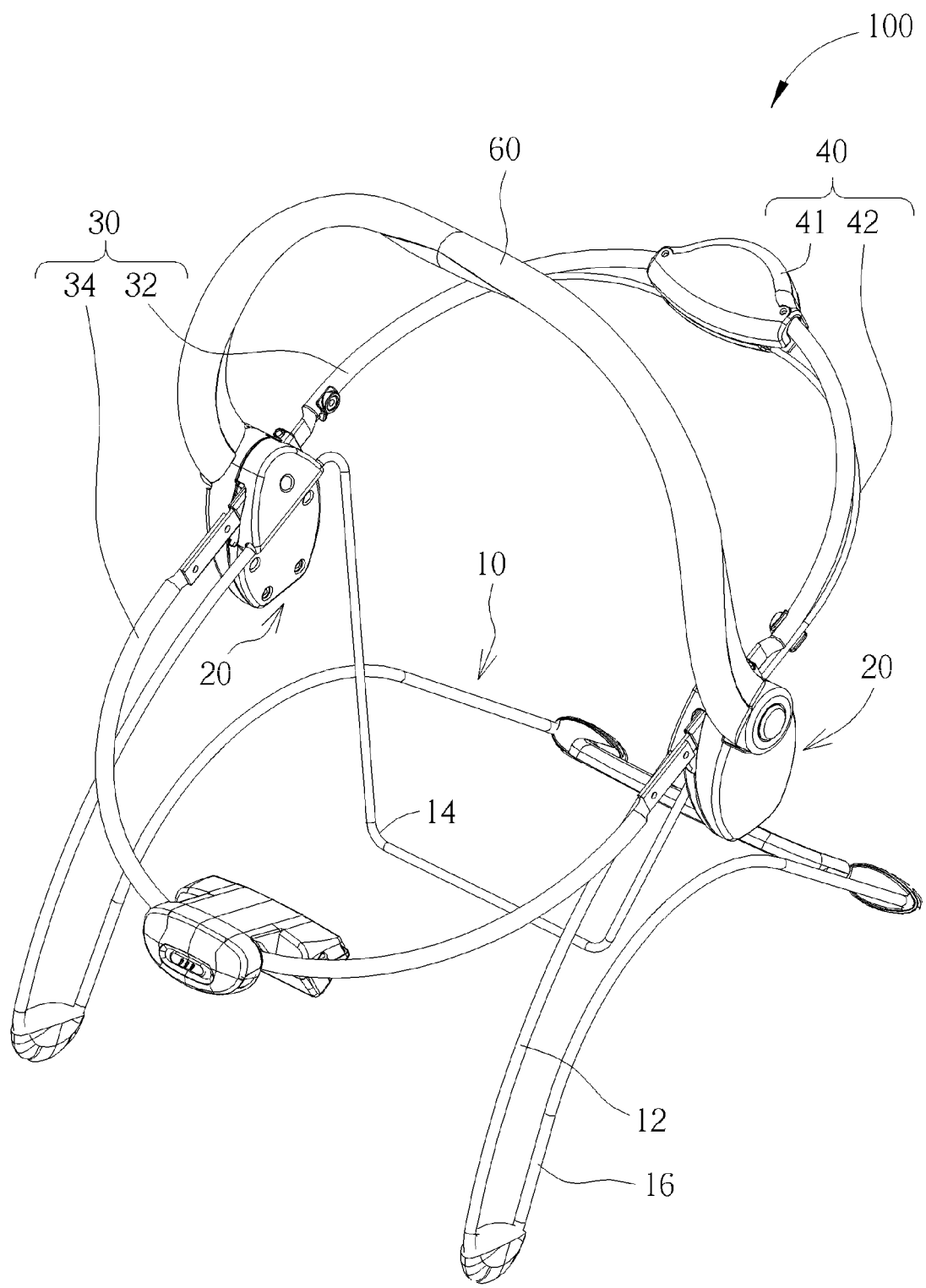
FIG. 1 is an illustration of an infant supporting device according to the invention.

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. In order to provide clearer descriptions to facilitate easily understanding of the present invention, the parts of the drawing may not draw in accordance with their relative sizes. Some sizes and scales have been exaggerated. The parts of unrelated details are not drawn completely to simplify the drawing.

Please refer to FIG. 1. FIG. 1 is an illustration of an infant supporting device 100 according to the invention. The infant supporting device 100 may be a bouncer seat with reclining and carry handle, or simply a chair with recline adjustment. In the embodiments of the invention, the infant supporting device 100 provides the caregiver with a seat that has multiple reclined positions for the comfort and safety of their child, along with a retractable carry handle for easily carrying the infant supporting device 100 from one place to another. The infant supporting device 100 incorporates a central member on either side that houses the reclining mechanism along with mounting locations for the seat frame, bounce wire, carry handle, and seat support wire.

The infant supporting device 100 includes a base frame 10, a pair of central members 20, a seat frame 30, a recline driving mechanism 40, and a carry handle 60. The base frame 10 includes a bounce wire 12, a seat support wire 14, and a support leg 16. When an infant is installed in the infant supporting device 100, the bounce wire 12 provides bouncing movement for the infant supporting device 100. The seat support wire 14 may be incorporated with the seat frame 30 and provide support for the infant installed therein, with soft goods wrapped on both the seat support wire 14 and the seat frame 30, as the bounce wire 12 bounces the seat frame 30. The support leg 16 may help the infant supporting device 100 be firmly located on a surface and be stabilized on the surface when the seat frame 30 is bounced.

The pair of central members 20 is mounted on the base frame 10 and the seat frame 30 is rotatably mounted on the pair of central members 20. The carry handle 60 is also mounted on the pair of central members 20 in a rotatable way. The recline driving mechanism 40 includes a recline handle 41 and a recline wire 42 connected to the recline handle 41. The recline handle 41 may be mounted on the seat frame 30 at a position easy for operation, or an upper frame 32 as shown in FIG. 1, and the recline wire 42 is coupled to the seat frame 30 so that the seat frame 30 may be adjusted to different recline positions.

Figure 2:
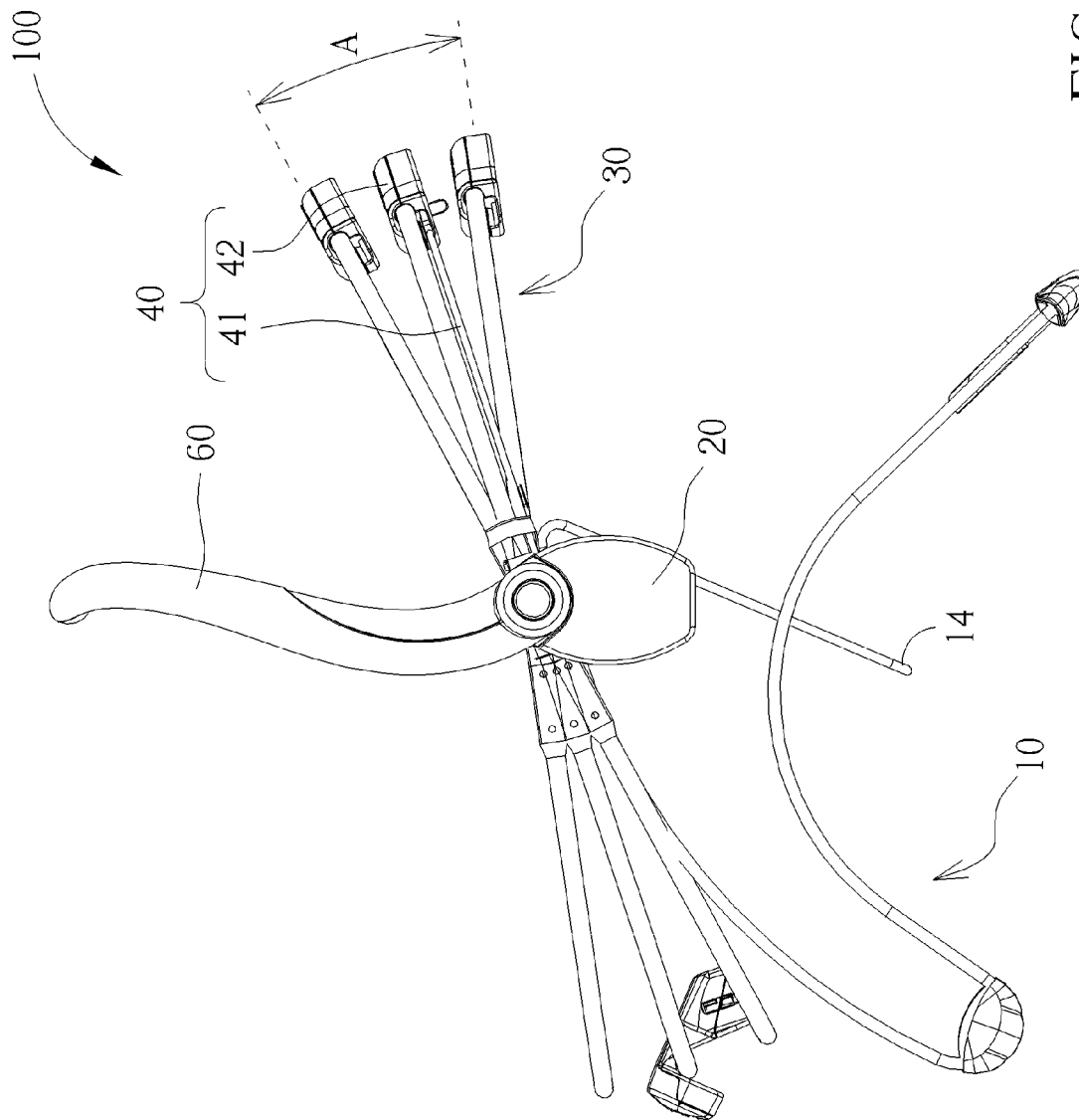
FIG. 2 is an illustration showing a seat frame rotatable and configured at various reclined positions with respect to the rest of the infant supporting device.
Figure 3:
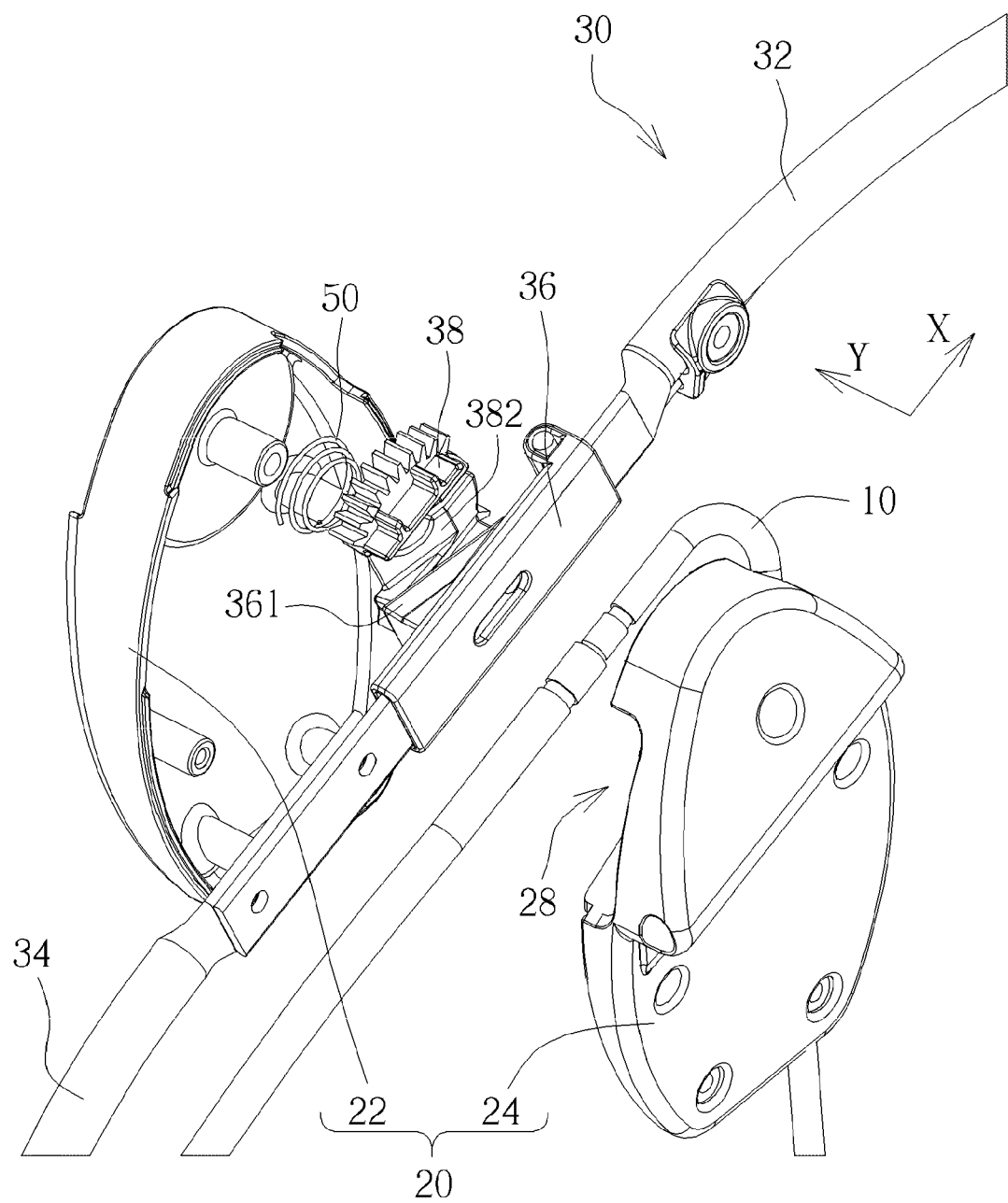
FIG. 3~FIG. 6 are illustrations show exploded views of the central members, the seat frame, and the recline driving mechanism 40 in various perspective angles.
Figure 4:
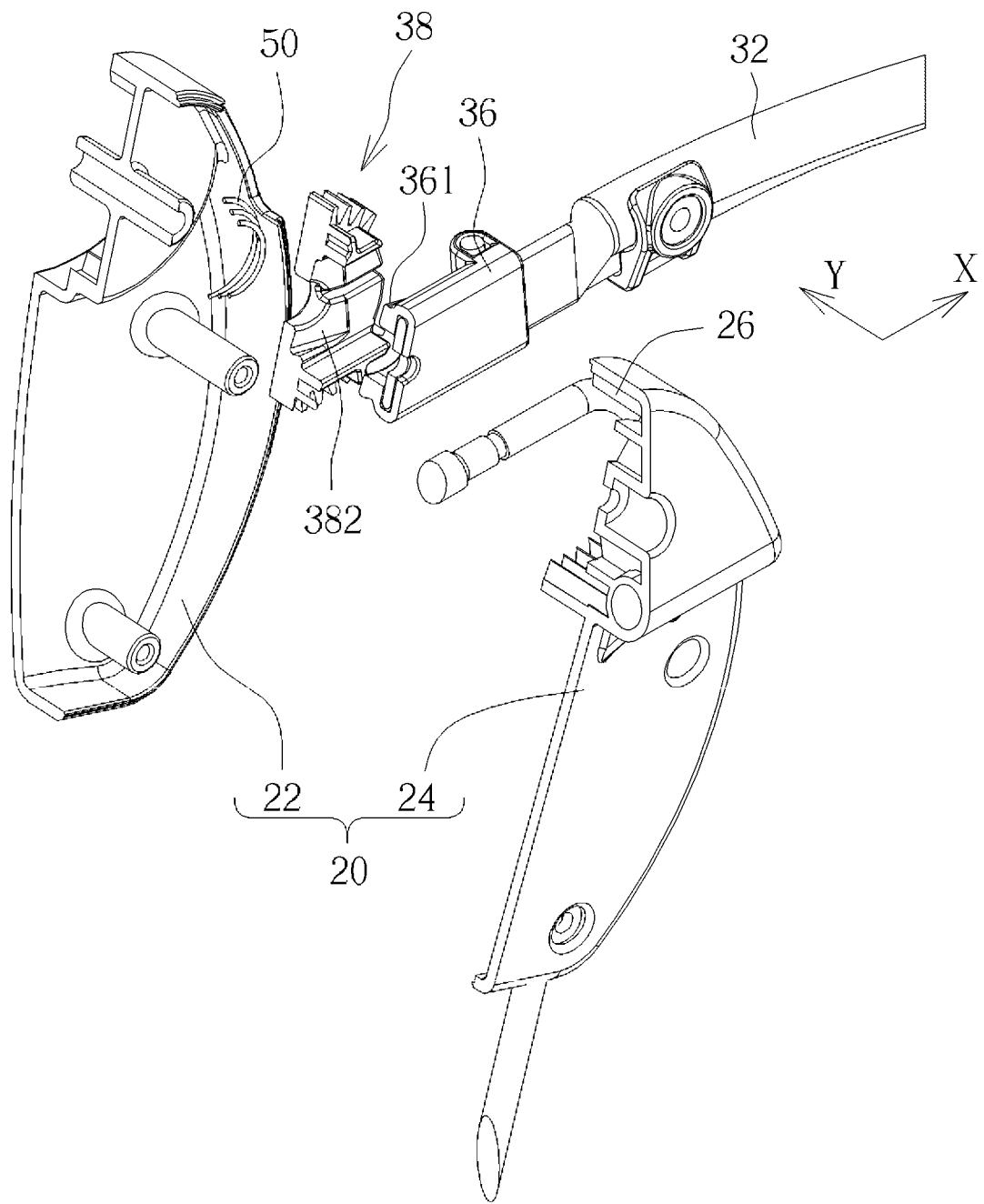

Please refer to FIG. 2. FIG. 2 is an illustration showing the seat frame 30 rotatable and configured at various reclined positions with respect to the rest of the infant supporting device 100. As shown in FIG. 2, the seat frame 30 rotates as a whole with respect to the central members 20 within an angle range A.

Figure 5:
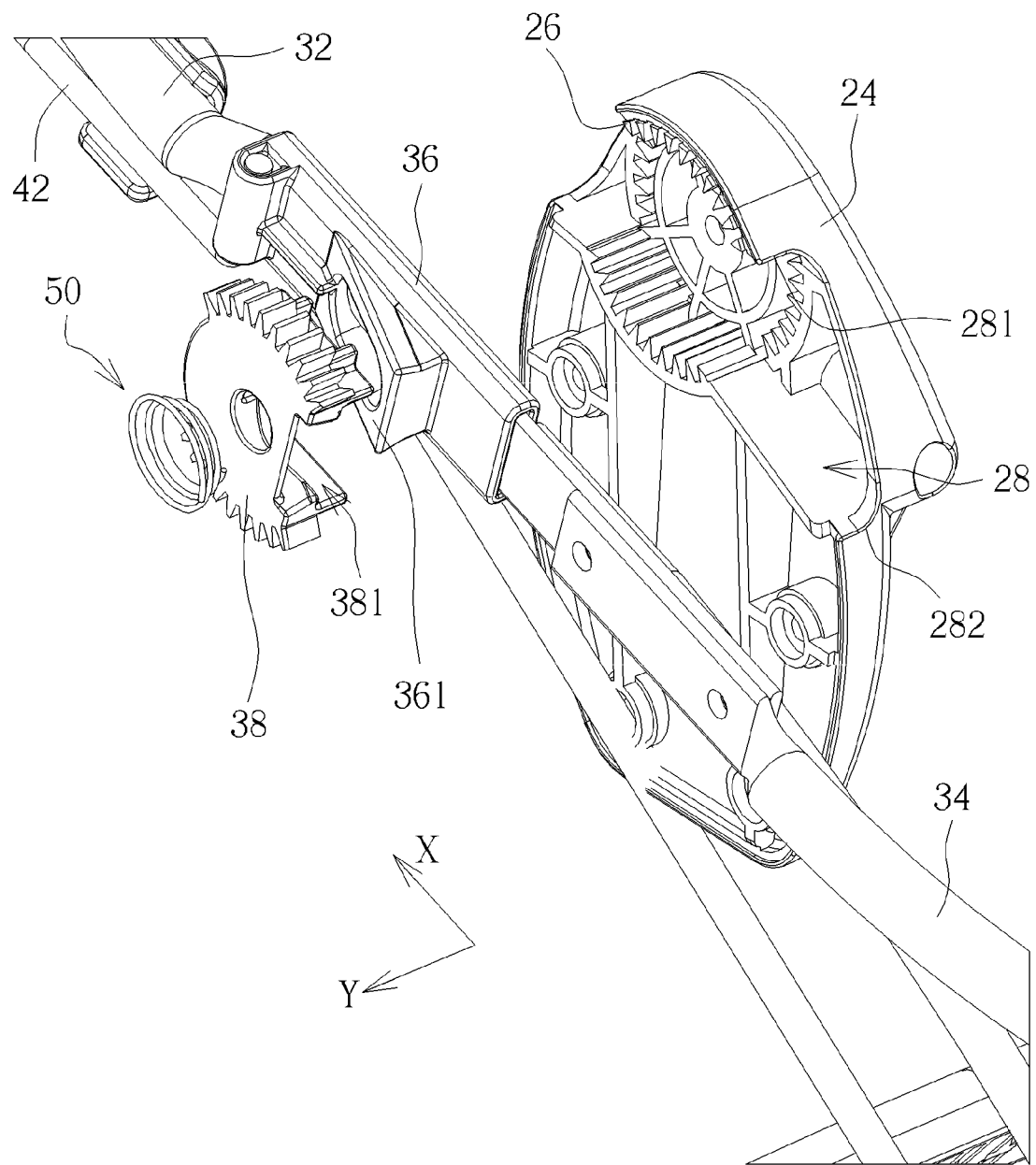
Figure 9:
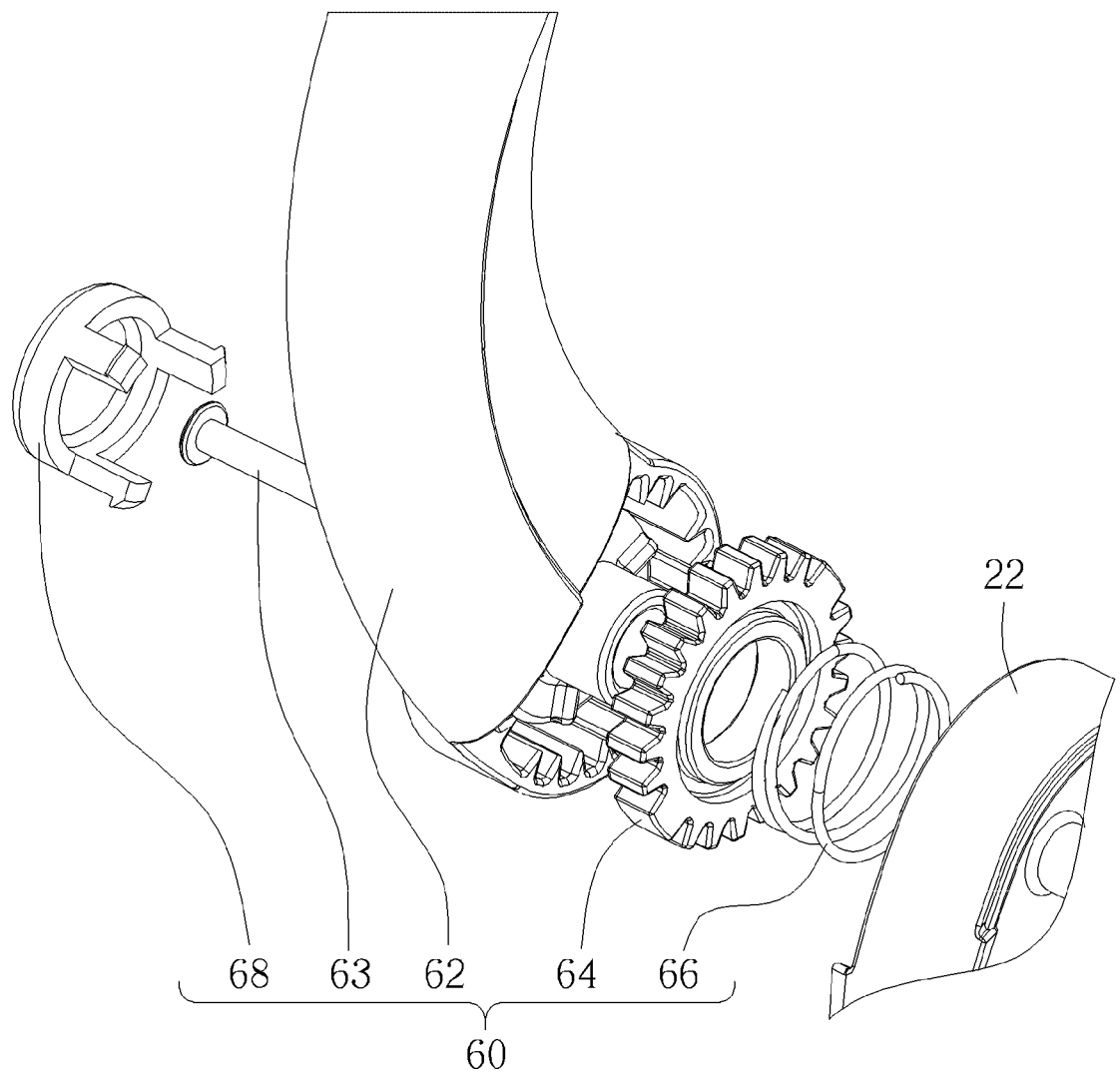
FIG. 9~FIG. 11 are illustrations showing exploded views of the carry handle 60 in various perspective angles.
Figure 10:
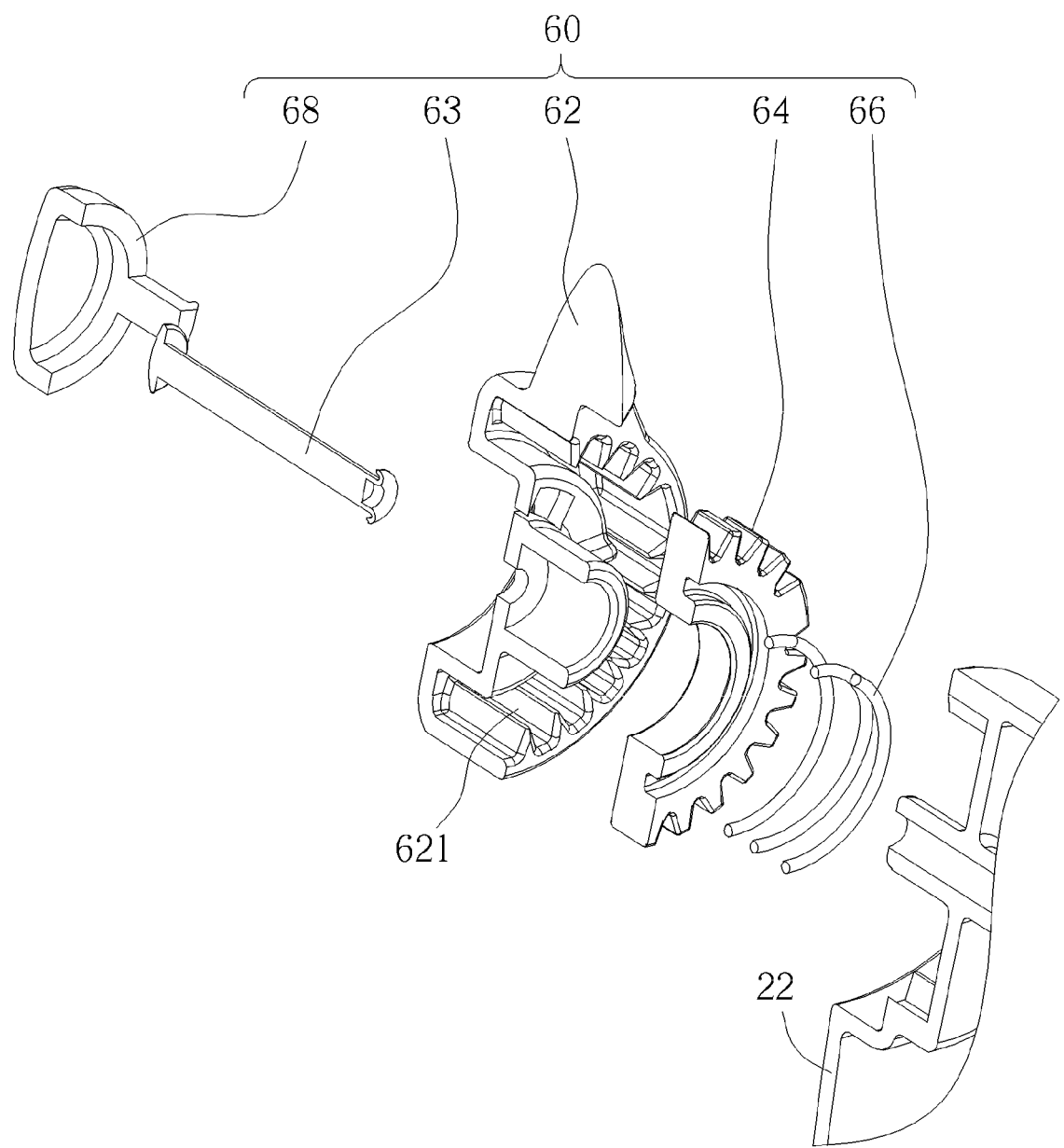
Figure 11:
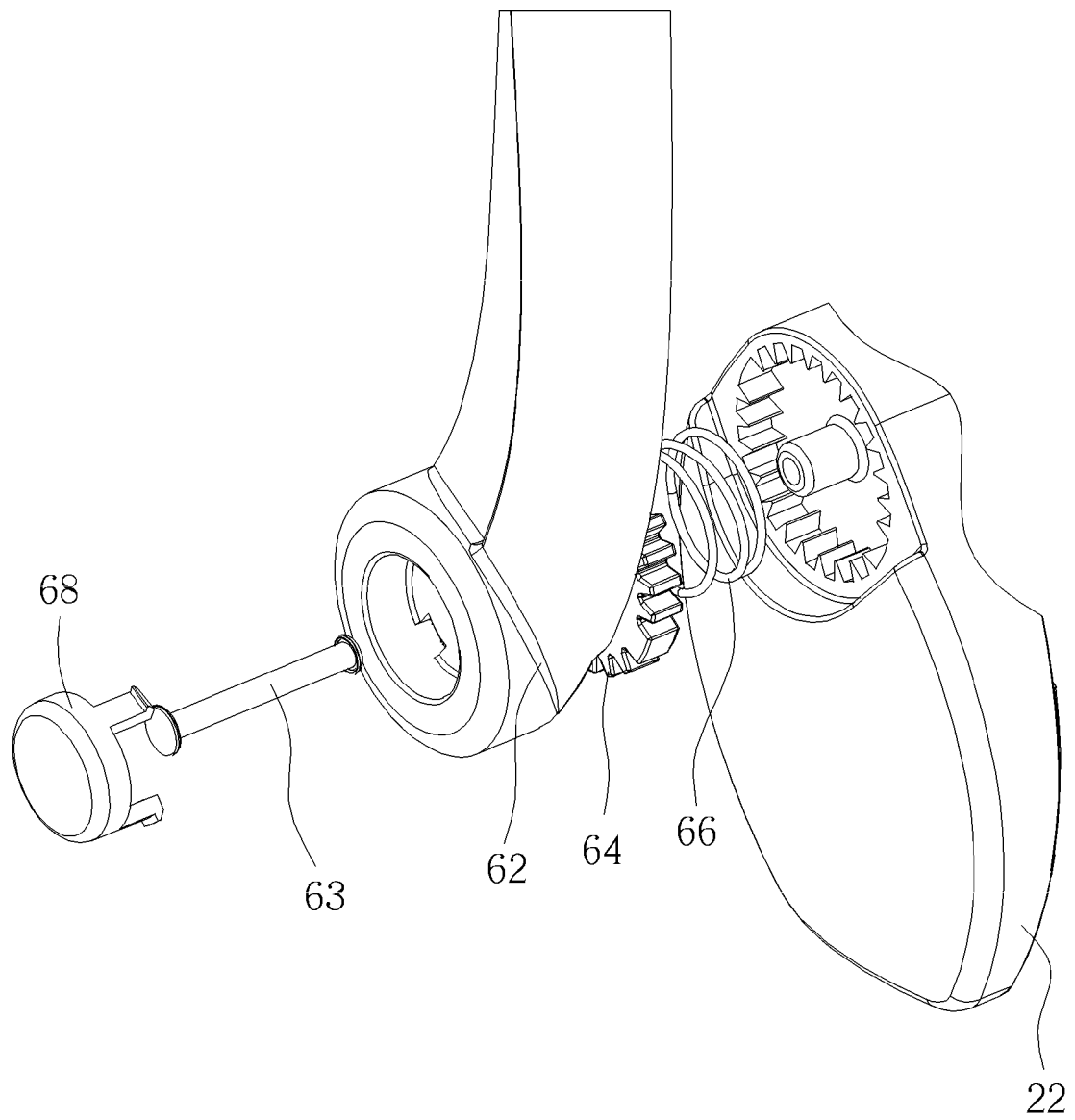

Please refer to FIG. 3~FIG. 6. These figures show exploded views of the central members 20, the seat frame 30, and the recline driving mechanism 40 in various perspective angles. As shown in these figures, each of the central members 20 is a two-part component that has an outer member 22 and an inner member 24 held together by a rolled rivet (the rivet 63 as shown in FIG. 9~FIG. 11) that acts as a pivot. One of (or both) the central members 20 includes a first gear 26 disposed at an inner wall of the inner member 24 as shown in FIG. 5.

The seat frame 30 includes a main body, a sliding member 36, and a second gear 38. The main body is composed of the upper frame 32 and a lower frame 34 assembled with each other via welding, bolting, or any possible way. The sliding member 36 is slidably mounted on the main body, more specifically, on the upper frame 32 of the main body. It is an alternative that the sliding member 36 is mounted on the lower frame 34 for another embodiment of the invention.

The second gear 38 is disposed between the sliding member 36 and the outer member 22 of the central member 20. The infant supporting device 100 also includes a restoring member 50, or a spring as a preferred embodiment shown in the figures, disposed and connected between the second gear 38 and the outer member 22. The second gear 38 of the seat frame 30 is adapted to be selectively in mesh with the first gear 26 of the central member 20. As the second gear 38 is in mesh with the first gear 26, the seat frame 30 is retained by the central members 20 at a certain reclined position; as the second gear 38 is out of mesh with the first gear 26, the seat frame 30 may be rotated with respect to the central members 20 to another reclined position.

Figure 6:
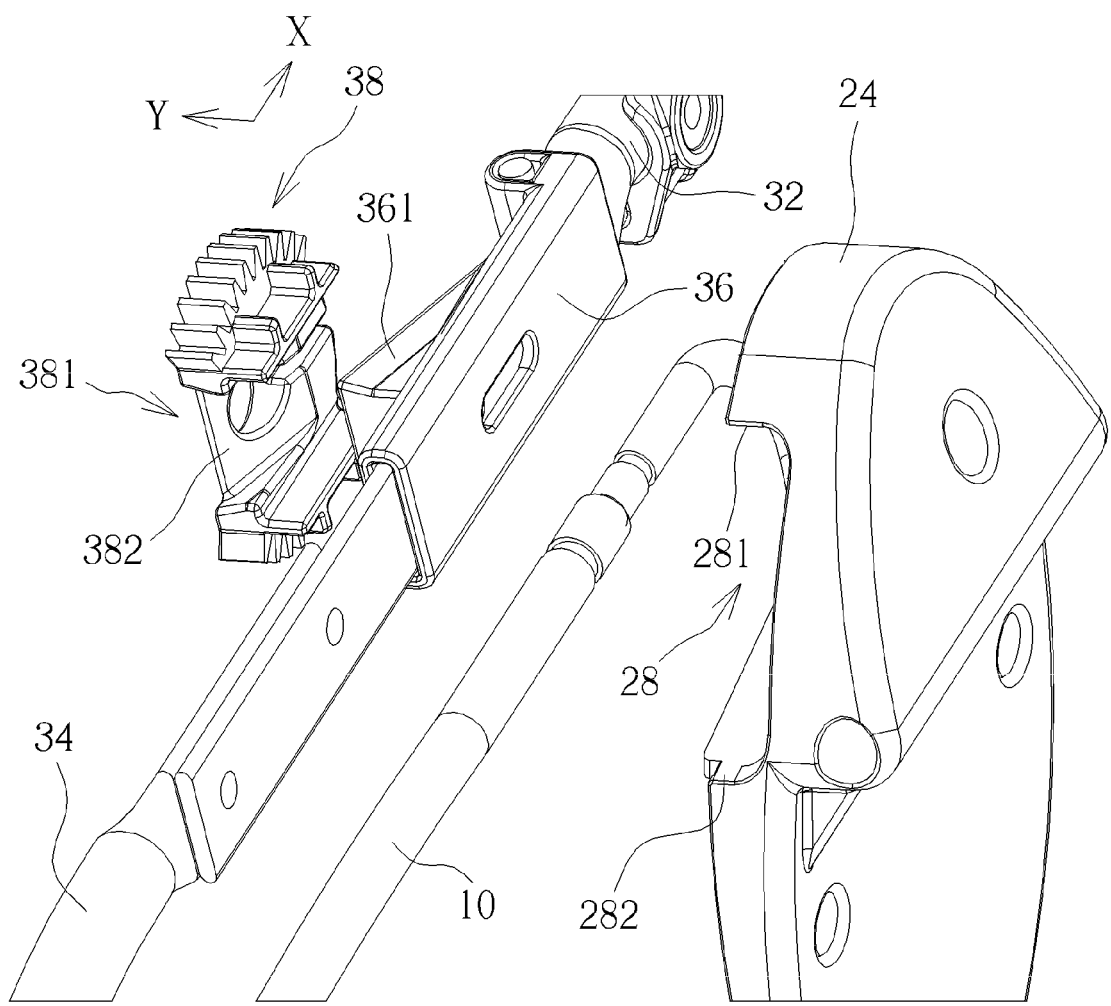

The sliding member 36 includes a first incline surface 361 extending along direction X, and the second gear 38 includes a channel 381 also extending along direction X as shown in FIG. 5 and FIG. 6. In the channel 381, the second gear 38 further has a second incline surface 382 extending along direction X. The first incline surface 361 is located and moveable in the channel 381, abutting against the second incline surface 382.

Please refer to FIG. 5. The recline wire 42 of the recline driving mechanism 40 is coupled to the sliding member 36, illustrated in the embodiment as shown in FIG. 5 as a bending end plugged in a through hole of the sliding member 36, to move the sliding member 36 along the main body (the upper frame 32 in the embodiment). When the sliding member 36 is moved by the recline driving mechanism 40 along direction X on the upper frame 32, the first inclined surface 361—an angled, cam surface—abuts against the second inclined surface 382—a mating cam surface—of the second gear 38, pushes the second gear 38 along direction Y, and disengages the second gear 38 from the first gear 26 of the inner member 24. At such status, the seat frame 30 is free from the engagement of the central members 20, rendering the seat frame 30 rotatable to one of a plurality of reclined positions with respect to the central members 20 and the base frame 10 as shown in FIG. 2.

Meanwhile, the restoring member 50 is compressed by the second gear 38 so as to provide a restoring force to the second gear 38, or spring-biased inward, that can push the second gear 38 back to the status to be in mesh with the first gear 26 again when the recline driving mechanism 40 is no longer operated, by a user, to move the sliding member 36.

Please keep referring to FIG. 5 and FIG. 6. As noted earlier, the central member 20 is composed of the outer member 22 and the inner member 24 that house portion of the seat frame 30 as shown in the figures. Each of the central members 20 includes an opening 28, allowing the main body of the seat frame 30 to pass. Each of the openings 28 has an upper end 281 and a lower end 282. Given the upper ends 281 and the lower ends 282, the main body (or the seat frame 30) may be specifically withstood to have a range of recline angles when the infant supporting device 100 is adjusted with its seat frame 30 to several recline angles.

Figure 7:
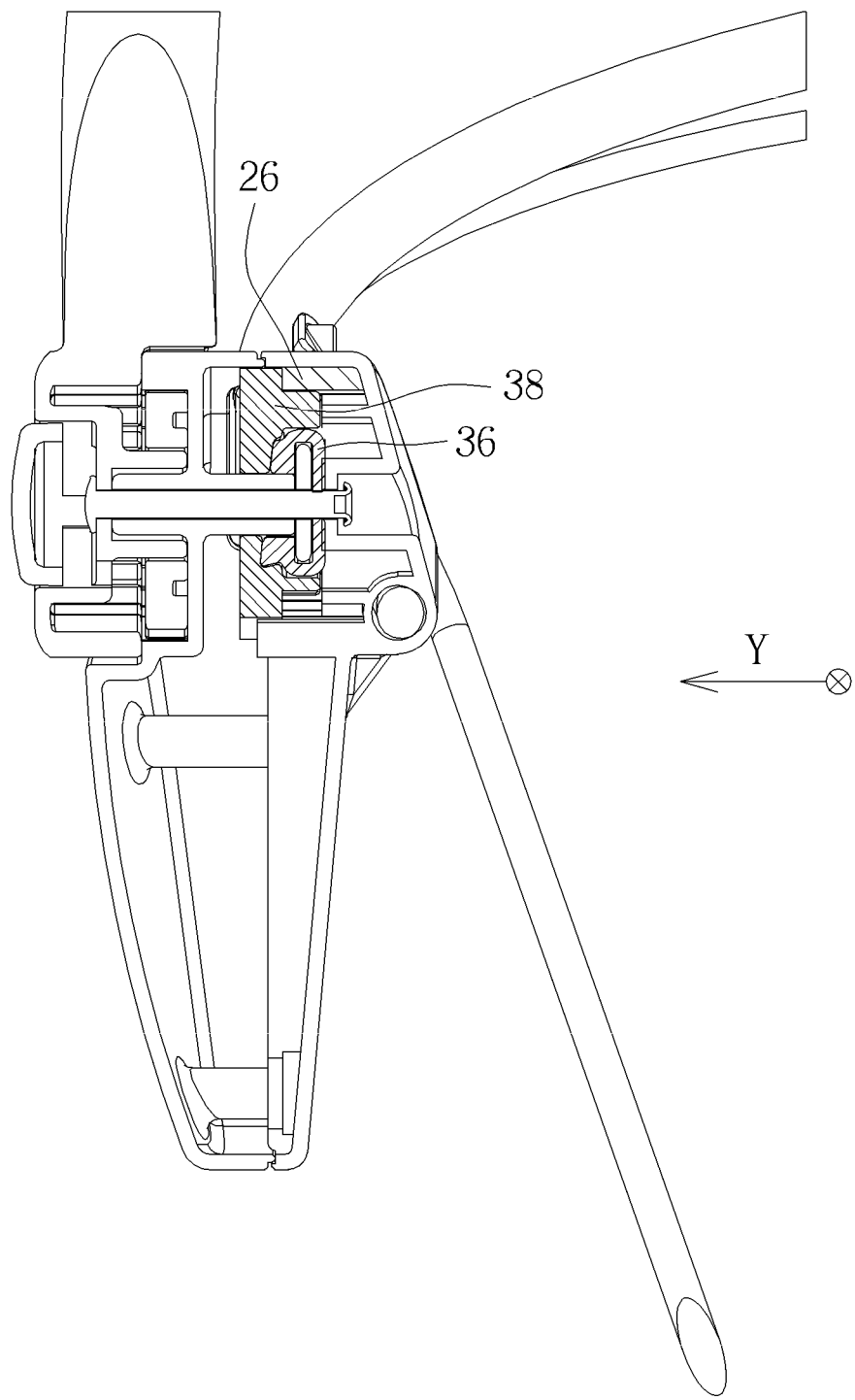
FIG. 7 is an illustration showing cross-sectional view of the second gear in mesh with the first gear.
Figure 8:
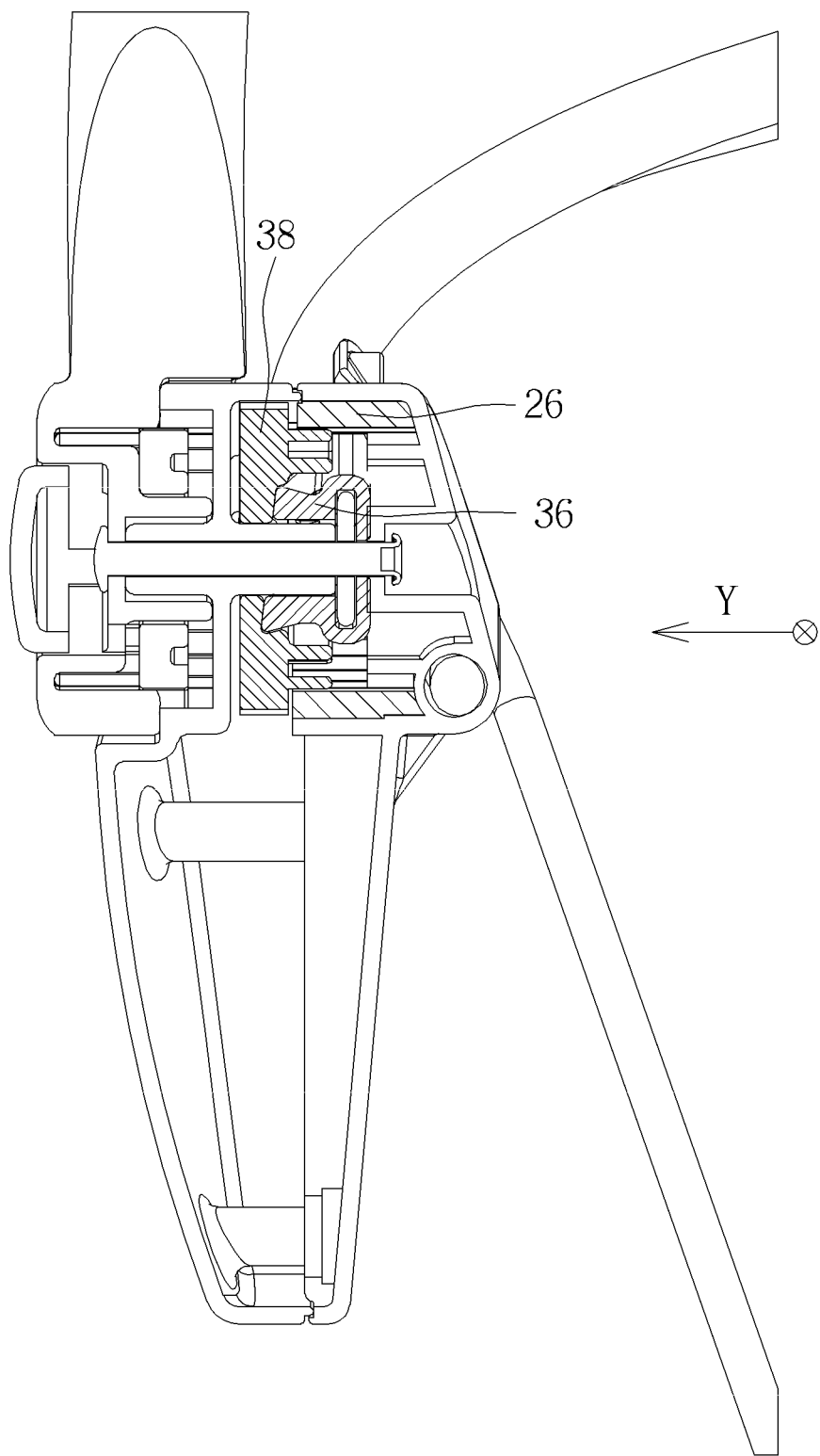
FIG. 8 is an illustration showing cross-sectional view of the second gear pushed by the sliding member toward direction Y to disengage from the first gear.

Please refer to FIG. 7 and FIG. 8. FIG. 7 and FIG. 8 show illustrations of cross-sectional views of the parts encompassed in the central member 20. FIG. 7 shows that the second gear 38 is in mesh with the first gear 26, and FIG. 8 shows that the second gear 38 is pushed by the sliding member 36 toward direction Y so as to disengage from the first gear 26.

It should further be noted that since the main body includes the upper frame 32 and the lower frame 34 assembled with each other via welding, bolting, or any possible way, the whole main body pivots about the central members 20, which allows the feet of an infant installed therein to also be brought upward or downward when reclining the seat frame 30. This is advantageous particularly for smaller infants who do not have good head and neck control, as it provides a more comfortable and accommodating space for their developmental needs.

Please refer to FIG. 9~FIG. 11. These figures show exploded views of the carry handle 60. The carry handle 60 works independently from the seat frame 30. The carry handle 60 includes a handle adjustment button 68 at each side, a handle body 62, a handle gear 64 at each side, and a spring 66 at each side. The carry handle 60 can be adjusted to its retracted position by depressing the handle adjustment buttons 68 and then rotating the carry handle 60 downward toward the seat frame 30. The carry handle 60 is held in position via the handle gears 64, which are spring-biased outward to be in mesh with the handle body 62. When the handle adjustment buttons 68 are depressed, they push against the handle gears 64, which compress the springs 66, and disengage the handle gears 64 from the handle body 62, allowing the handle body 62 to be rotated downward or upward by the caregiver.

The infant supporting device provided in the embodiments of the invention incorporates a central member on either side of the seat frame that houses the reclining mechanism along with mounting locations for the seat frame, the bounce wire, the carry handle, and the seat support wire. With one movement of the recline driving mechanism, the sliding member in the seat frame pushes the second gear to disengage from the first gear of the central member, and the main body of the seat frame is then rotatable with respect to the central members within a range of recline angles. The design provides an economical, smaller, and lighter weight solution to house the main features of the infant supporting device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An infant supporting device, comprising:
   a base frame;
   a pair of central members mounted on the base frame, one of the central members comprising a first gear;
   a seat frame rotatably mounted on the pair of central members, the seat frame comprising:
      a main body;
      a sliding member slidably mounted on the main body; and
      a second gear in mesh with the first gear of the central member and adapted to be moved by the sliding member to disengage from the first gear; and
   a recline driving mechanism coupled to the sliding member and adapted to move the sliding member along the main body;
   wherein when the second gear is moved by the sliding member to disengage from the first gear, the main body is adjustable to one of a plurality of reclined positions with respect to the base frame.

2. The infant supporting device of claim 1, wherein the sliding member comprises a first incline surface and the second gear comprises a channel having a second incline surface, the first incline surface moveable in the channel and the second incline surface adapted to be abutted by the first incline surface to disengage from the first gear.

3. The infant supporting device of claim 1, wherein the sliding member is adapted to be moved by the recline driving mechanism in a first direction along the main body and the second gear is adapted to be moved by the sliding member in a second direction.

4. The infant supporting device of claim 1, further comprising a restoring member connected between the second gear and the central member and adapted for providing a restoring force to the second gear when the second gear is moved by the sliding member.

5. The infant supporting device of claim 1, wherein each of the central members comprises an opening for allowing the main body of the seat frame to pass, each of the openings having an upper end and a lower end for withstanding the main body.

6. The infant supporting device of claim 1, wherein the main body comprises an upper frame and a lower frame assembled with each other, and the sliding member is slidably mounted on the upper frame.

7. The infant supporting device of claim 1, wherein the base frame comprises a bounce wire for providing bouncing movement for the seat frame, a seat support wire for supporting the seat frame, and a support leg for stabilizing the infant supporting device on a surface.

8. The infant supporting device of claim 1, further comprising a carry handle rotatably mounted on the central members.

9. The infant supporting device of claim 1, wherein the recline driving mechanism comprises a recline handle and a recline wire that is connected to the recline handle, the recline handle mounted on the main body and the recline wire coupled to the sliding member.

* * * * *